No. 621,527. Patented Mar. 21, 1899.
H. HATTER.
CULTIVATOR FOR CRANBERRY VINES.
(Application filed Mar. 11, 1898.)
(No Model.)
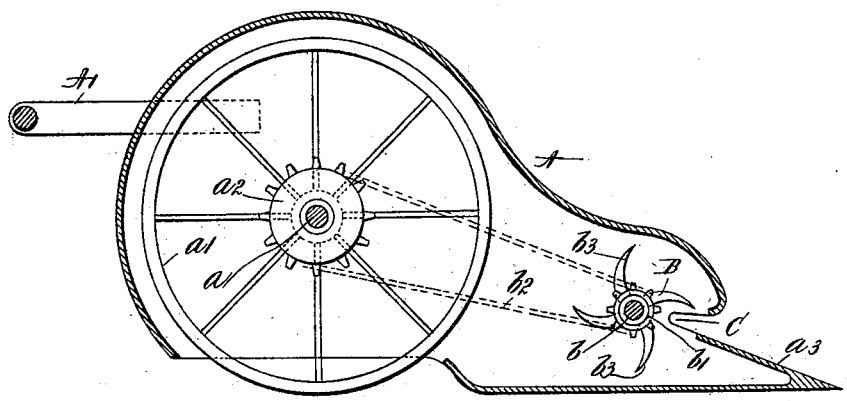
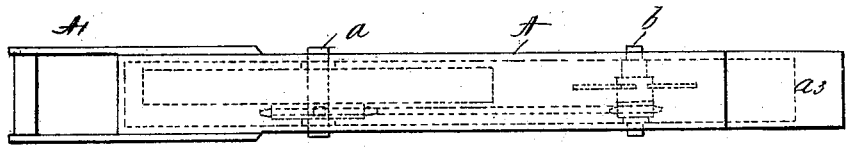
WITNESS
John Buckler
L. W. Muller
INVENTOR
Henry Hatter,
BY
Edgar Tate & Co.
ATTORNEYS.

UNITED STATES PATENT OFFICE.

HENRY HATTER, OF NEW YORK, N. Y.

CULTIVATOR FOR CRANBERRY-VINES.

SPECIFICATION forming part of Letters Patent No. 621,527, dated March 21, 1899.

Application filed March 11, 1898. Serial No. 673,510. (No model.)

*To all whom it may concern:*

Be it known that I, HENRY HATTER, a citizen of the United States, residing at New York, (Brooklyn,) in the county of Kings and State of New York, have invented certain new and useful Improvements in Cultivators for Cranberry-Vines, of which the following is a full and complete specification, such as will enable those skilled in the art to which it appertains to make and use the same.

This invention relates to agricultural implements which are particularly adapted for use in connection with the cultivation of cranberries and similar plants; and the object is to provide a cultivator which is simple in construction, effective in operation, and economical to manufacture.

The invention consists of a cultivator constructed substantially as hereinafter described, and defined in the claim.

The invention is fully disclosed in the following specification, of which the accompanying drawings form a part, in which the separate parts of my improvement are designated by the same letters of reference in each of the views and in which—

Figure 1 is a vertical central section of the improved cultivator, and Fig. 2 is a top view thereof.

Referring to the drawings, A represents a shell or casing which is adapted to inclose the working parts of the apparatus and may be constructed of wood or sheet metal properly curved or formed to accomplish the intended purpose. The frame A is provided with a suitable handle A', by means of which the cultivator may be propelled. The frame A is provided with a shaft $a$, journaled therein, and fixed upon said shaft is a supporting-wheel $a'$ and a sprocket-wheel $a^2$, adjacent thereto. In the forward portion of the frame A is journaled a second shaft $b$, upon which is fixed the cutter-wheel B and a small sprocket-wheel $b'$, which is operatively connected with the large sprocket-wheel $a^2$ by means of a sprocket-chain $b^2$.

The cutter-wheel B is preferably provided with a plurality of curved cutter-blades $b^3$, which cross an inwardly-extending slot C during the revolution of the cutter-wheel. The bottom of the frame A, at the front portion thereof, is formed flat and is adapted to rest upon and move along the ground and terminates in a pointed or wedge-shaped prow $a^3$, the upper side of which is inclined upwardly to the slot C. The upper portion of the frame A projects forwardly at its end above the inclined upper side of the prow $a^3$, forming the upper edge of the slot C.

In the operation of the cultivator the rotation of the wheel causes the revolution of the larger sprocket-wheel $a^2$, which in turn rotates the small sprocket-wheel $b'$ and the cutter-wheel B. The forward motion of the cultivator causes the prow $a^3$ to take under the vines of the cranberry or other plant and the vines are forced upward along the inclined upper side of the prow until they enter the slot C. The blades of the rotating cutter-wheel sever the ends of the vines, which drop down upon the side of the cultivator, after which the same may be raked up and carried away. The device will also operate to harrow the ground more or less, and thus aid in advancing the growth of the vines.

Having fully described my invention, I claim as new and desire to secure by Letters Patent—

A cultivator for cranberries and the like, which comprises a casing having a narrowed front portion and an enlarged rear portion, an axle passing through said rear portion, and a drive-wheel and a sprocket-wheel mounted thereupon, an opening in the lower portion of said casing through which said drive-wheel passes, an axle passing through said forward portion, a cutter-wheel and a sprocket-wheel mounted thereupon, a chain passing about said sprocket-wheels, an opening in said casing forward of said cutter-wheel the upper portion of said casing forward thereof being adapted to be used as a feed-plate for said cutter-wheel, said casing terminating forwardly in a wedge-shaped prow adapted to lift and feed the vines to said feed-plate and a handle secured to the rear portion of said casing, said casing having continuous sides, top and bottom excepting where broken for said cutter-wheel and said drive-wheel, substantially as described.

In testimony that I claim the foregoing as my invention I have signed my name, in presence of the subscribing witnesses, this 2d day of March, 1898.

HENRY HATTER.

Witnesses:
L. M. MULLER,
A. C. MCLOUGHLIN.